Figure 2:
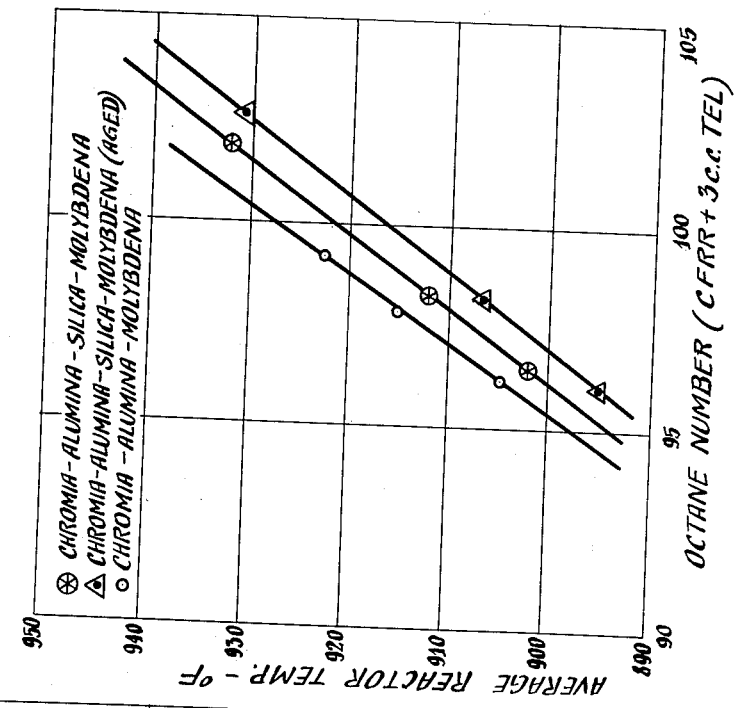

July 31, 1956

W. A. STOVER 2,757,145

REFORMING CATALYST CONSISTING OF CHROMIA, SILICA, ALUMINA, AND MOLYBDENA AND METHOD FOR PREPARING THE SAME

Filed July 21, 1952

INVENTOR.
William A. Stover
BY
Raymond W. Barclay
ATTORNEY

United States Patent Office 2,757,145
Patented July 31, 1956

2,757,145

REFORMING CATALYST CONSISTING OF CHROMIA, SILICA, ALUMINA, AND MOLYBDENA AND METHOD FOR PREPARING THE SAME

William A. Stover, Pitman, N. J., assignor to Socony Mobil Oil Company, Inc., a corporation of New York Application July 21, 1952, Serial No. 299,932

9 Claims. (Cl. 252—453)

This invention relates to an improved reforming catalyst and method for preparing the same. More particularly, the present invention is directed to catalytic reforming carried out in the presence of a catalyst consisting essentially of a co-gelled chromia-alumina-silica composite of particularly defined composition impregnated with a specified amount of molybdena and to a process for preparing such catalyst.

Reforming operations wherein saturated gasoline fractions comprising straight run gasolines, natural gasolines, etc., are treated to improve the anti-knock characteristics thereof are well known in the petroleum industry. Straight run gasolines generally contain naphthenic hydrocarbons, particularly cyclohexane compounds, and paraffinic hydrocarbons which are usually of straight chain or slightly branched chain structure, as well as varying proportions of aromatic hydrocarbons. During reforming, a multitude of reactions take place, including isomerization, dehydrogenation, cyclization, etc., to yield a product of increased aromatic content. Thus, in reforming, it is desired to dehydrogenate the naphthenic hydrocarbons to produce aromatics, to cyclisize the straight chain paraffinic hydrocarbons to form aromatics, and to effect a controlled type of cracking which is selective both in quality and quantity.

Controlled or selective cracking is highly desirable during reforming since such will result in a product of anti-knock characteristics. As a general rule, the lower molecular weight hydrocarbons exhibit a higher octane number, and a gasoline number of lower average molecular weight will usually have a higher octane number. In addition, the isomerization and molecular rearrangement which occur during reforming also result in products having higher anti-knock characteristics. The splitting or cracking of carbon to carbon linkages must, however, be selective and should be such as not to result in substantial decomposition of normally liquid hydrocarbons into normally gaseous hydrocarbons. The selective cracking desired ordinarily involves removal of one or two lower alkyl groups such as methyl or ethyl from a given molecule in the form of ethane or methane. Thus, during reforming, it is contemplated that heptane may be converted to hexane, nonane to octane or heptane, etc. Uncontrolled cracking, on the other hand, results in decomposition of normally liquid hydrocarbons into normally gaseous hydrocarbons. For example, non-selective cracking of normal octane will ultimately lead to eight molecules of methane.

Uncontrolled reforming, moreover, generally results in rapid formation and deposition on the catalyst of large quantities of a carbonaceous material generally referred to as "coke." The deposition of coke on the catalyst surface diminishes or destroys its catalyzing effect and results in shorter processing periods with the accompanying necessity of frequent regeneration by burning the coke therefrom. In those instances where the activity of the catalyst is destroyed, it is necessary to shut down the unit, remove the deactivated catalyst and replace it with new catalyst. Such practice obviously is time-consuming and inefficient, imparting a greater overall expense to the reforming operation.

The choice of catalyst for promoting reforming of hydrocarbons and gasolines of enhanced octane rating is dependent on several factors. Such catalyst should desirably be capable of effecting reforming in a controlled and selective manner as discussed above to yield a product of improved anti-knock characteristics. The catalyst selected should further be resistant to poisoning and particularly to sulfur poisoning so that sulfur-containing stocks may undergo reforming without the necessity of subjecting the same to a preliminary treatment for desulfurization. The catalyst also should desirably be characterized by a low density, affording easy regeneration thereof, and by a high stability, and the method for preparing such catalyst should be commercially attractive, requiring a minimum of equipment and processing stages.

In accordance with the present invention, a catalyst of the above defined characteristics has been discovered. Broadly, the present invention comprises a reforming catalyst consisting essentially of co-gelled chromia, alumina, and silica, impregnated with a critical minor proportion of molybdena. The invention further comprises a method for preparing the catalyst under conditions such that a completely homogeneous active surface is obtained.

It has heretofore been proposed to employ composites containing two or more of the oxides of chromium, aluminum, and molybdenum as catalysts for various reactions. Several methods for preparing such catalysts have been proposed, including alternate impregnation of an alumina support with suitable chromium and molybdenum compounds and co-precipitation of solutions containing salts of the desired metals. The difficulties encountered in the former method are well-known in that a completely active surface is seldom attained. The latter technique, while overcoming this difficulty, is even more involved and requires extremely close control of pH and other variables to assure satisfactory results. Chromia-alumina composites heretofore recommended as reforming catalysts have been found to be characterized by a certain amount of instability, as indicated by the amount of $Cr_2O_3$ converted to the crystalline form during use. Catalysts of the present invention consisting essentially of co-gelled chromia-alumina-silica impregnated with molybdena have been found to have an improved stability in comparison with the aforesaid chromia-alumina composites and have further been found to have improved reforming activity in comparison with chromia-alumina composites or molybdena-alumina composites or chromia-alumina-molybdena composites. The catalyst described herein further exhibits greater selectivity over the aforementioned composites.

The method of reforming naphtha fractions of petroleum in the presence of a co-gelled chromia-alumina-silica composite impregnated with molybdena as described herein has been found to have certain advantages over commercially available processes. The advantages obtained upon reforming with the present catalyst, while not fully understood, are believed to result from the method of preparation of the catalyst employed. The instant method of catalyst preparation involves the formation of a hydrogel of chromia, alumina, and silica preferably containing a chromia-alumina-silica content of at least 10 per cent by weight and thereafter impregnating either the washed hydrogel or the dried and tempered material with a solution of a water-soluble molybdenum compound. A preferred embodiment of the invention involves the formation of co-gelled aluminum, silicon and chromium oxides which after drying and/or tempering are evacuated to a reduced pressure. The evacuated chromia-alumina-silica gel, generally in particle form, is brought into contact with a solution of a water-soluble molybdenum compound. Molybdic acid or the alkaline salts thereof are preferred for such purpose. The concentration of the water-soluble molybdenum compound in the impregnating solution may be varied, depending upon the catalyst composition desired. Sufficient solution is used so that the particles of chromia-alumina-silica gel may be completely impregnated. The gel particles are permitted to remain in contact with the impregnating solution for a predetermined time sufficient to permit the solution to impregnate the gel. After completion of the impregnation, the catalyst is removed and slowly heated to an elevated temperature not exceeding about 1000° F. During this heating treatment it is desirable that the atmosphere surrounding the material be free of oxygen. Such an atmosphere is provided in a preferred embodiment of the invention by permitting the steam produced during the course of heating from moisture contained in the catalyst after impregnation to blanket the catalyst mass. The impregnated dried catalyst consisting essentially of a co-gel of alumina, chromia, and silica impregnated with molybdenum oxide is thereafter ready for use.

Composites consisting of predominant proportions of alumina and chromia together with minor proportions of silica and molybdena are suitably prepared by the method of the invention. Thus, the catalysts described herein ordinarily have a composition of 25 to 50 per cent by weight of chromia, 30 to 69 per cent by weight of alumina, 1 to 5 per cent by weight of silica and 5 to 15 per cent by weight of molybdena. Catalysts having a composition of 27 to 30 per cent by weight of chromia, 55 to 62 per cent by weight of alumina, 3 to 5 per cent by weight of silica and 8 to 12 per cent by weight of molybdena are unusually effective for promoting reforming operations in which a saturated gasoline is subjected to conversion to produce a reformed gasoline of improved anti-knock characteristics.

The method of the invention provides a simple but highly effective procedure for preparation of molybdena-containing reforming catalyst. The co-gel of chromia-alumina-silica is a true gel prepared by forming a hydrosol of chromia, alumina, and silica, permitting said hydrosol to set to an all-embracing hydrogel and thereafter drying the hydrogel. The gel, as indicated above, is suitably but not necessarily in particle form prior to impregnation. The particles may be of irregular size such as those produced by breaking up a previously set gel or the particles may be in the form of extruded or pressed pellets. Preferably, however, the alumina-chromia-silica gel particles are in the form of spheroids prepared by introducing the hydrosol in the form of globules into a water-immiscible medium wherein the hydrosol globules set to spheroidal hydrogel particles which are thereafter removed and dried to form hard gel spheroids highly resistant to attrition. It is particularly preferred to prepare a co-gelled catalytic composite of chromia, alumina, and silica from a hydrosol having an inorganic oxide content of at least about 10 per cent by weight following the process described in co-pending application Serial No. 201,537, filed December 14, 1950, by myself and Robert C. Wilson, Jr. A process for preparing hydrogels of high product concentration has been set forth in detail in the aforementioned patent. For convenience, herein, the following is offered as a brief description of said process.

A true all-embracing chromia-alumina-silica hydrogel having an inorganic oxide product concentration of at least about 10 per cent by weight and a relatively short gelation period, i. e., less than two hours and preferably less than 60 seconds, is prepared by intimately admixing an organic chromium salt such as chromic acetate and an alkali metal aluminate such as sodium aluminate and a water-soluble silicon compound, preferably an alkali metal silicate such as sodium silicate, to produce a chromia-alumina-silica hydrosol. The hydrosol so formed is permitted to set to a hydrogel. The resulting hydrogel is thereafter subjected to aging and then water-washed, dried, and calcined to yield a chromia-alumina-silica gel composite. In accordance with the instant invention, the concentrations of reactants employed should be such as to afford a chromia-alumina-silica gel of composition within the range set forth hereinabove.

It is preferred, in preparing the above-described hydrogels, to use aqueous solutions of sodium aluminate, chromic acetate, and sodium silicate. Sodium silicate is present in minor proportion while sodium aluminate and chromic acetate are the predominant reactants. Neither of these latter two substances is a true chemical compound. The ratio of sodium to aluminum can be varied widely as can the ratio of acetate to chromium ion. Variation in the sodium to aluminum ratio of the sodium aluminate solution requires compensating adjustment of the acetate to chromium ratio of the chromic acetate solution in order to achieve satisfactory gelation. Hydrosols capable of setting to hydrogels in less than about 20 seconds are particularly desirable for the production of bead-like spheroidal particles by methods well-known in the art, for example, those described in patents to Marisic, such as U. S. Patent No. 2,384,946.

Quick-setting hydrosols of low viscosity which can be readily handled at bead-forming nozzles are those prepared from sodium aluminate solutions which have a sodium to aluminum mole ratio referred to as "R" of between 1 and 1.5. The acetate to chromium mole ratio in the chromic acetate solution employed should be not less than $2.8R-1.8$ and not more than $4R-2.4$ and preferably in the range of $4R-2.8$ to $4R-2.4$.

The control of the mole ratios discussed above is readily achieved in the manufacture of reactant solutions. Chromium acetate is readily formed without introduction of undesirable extraneous materials by reducing sodium dichromate with glycolic acid in the presence of acetic acid as described more fully in my copending application Serial No. 174,594, filed July 18, 1950.

Sodium aluminate is conveniently prepared from caustic soda of 50° Bé. and aluminum trihydrate. At a sodium to aluminum mole ratio in the range of 1.25/1 to 1.5/1, the sodium aluminate is advantageously manufactured in an open agitated kettle at 220–230° F. with a reaction time of 1 to 3 hours. Solutions having a lower mole ratio down to about 1.0/1 are made in an autoclave at 240–300° F. and 10 to 30 pounds per square inch gauge at the same reaction time. Sodium aluminate solutions having a low sodium to aluminate ratio less than 1.3 are relatively unstable and may be stabilized by the addition of such organic materials as glycerine, starch, sugar, and the like.

The sodium silicate solution employed should contain less than about 15 per cent by weight of $SiO_2$ and preferably less than 10 per cent by weight $SiO_2$. It has been established that if the concentration of the sodium silicate solution is greater than that specified, precipitation will occur particularly when the silicate solution is brought into contact with the sodium aluminate solution, thereby making the resultant solution unsatisfactory for the preparation of desired all-embracing hydrogels. The particular water content of the aqueous sodium silicate solution employed is determined by the quantity of water required for dilution of the remaining reactants, that is, the sodium aluminate and chromic acetate. The concentration will depend upon the desired product concentration in the resulting hydrosol and the ratio of chromia to alumina present therein.

Thus, chromia-alumina-silica hydrogels having a short time of set and a high solids content, generally between about 10 and about 30 per cent by weight, may readily be prepared by controlling the sodium to aluminum mole ratio of the sodium aluminate solution employed, the acetate to chromium mole ratio of the chromic acetate solution and the water content of the sodium silicate solution. The specific ratios employed will depend upon the composition of the chromia-alumina-silica hydrogel desired.

Temperature, acidity, and product concentration are interrelated variables effecting gelation and within the limits in which formation of hydrogels occurs, they control gelation time. In general, the other factors can be controlled to achieve gelation at any practical solution temperature. Thus, temperatures from 30° F. to 130° F. are suitable. Best gelation times are experienced at temperatures between about 120° F. and about 140° F. The pH of the chromia-alumina-silica hydrogels is generally between 10 and 13. For bead formation, a pH of about 12 yields excellent results.

For the production of chromia-alumina-silica hydrogel beads, preparation is generally carried out following the procedure described in the above-noted Marisic patent for producing silica-alumina beads. Thus, a chromic acetate solution and a sodium aluminate solution, the latter having been previously mixed with a sodium silicate solution, are contacted in a mixing nozzle and discharged onto the apex of a dividing cone from which a number of small streams flow into a column of water-immiscible liquid. The temperature of said water-immiscible liquid is desirably maintained constant by circulation through a heat exchanger outside the bead-forming tower.

The freshly formed chromia-alumina-silica hydrogel above-described is subject to a loss of aluminum as sodium aluminate if immediately washed with water. This tends to weaken the hydrogel to such an extent that it disintegrates in the wash water. That adverse effect can be avoided by immediately treating the freshly formed hydrogel in a slightly alkaline aqueous medium. This is generally accomplished by bringing the freshly formed chromia-alumina-silica hydrogel into contact with an aqueous solution of an ammonium salt of a mineral acid or a mineral acid or a mixture of such salt and acid. In a typical operation, the freshly formed hydrogel beads are sluiced out of the forming tower with oil. The hydrogel beads are then separated from the oil and treated with a 20 per cent by weight solution of ammonium sulfate. The solution is advantageously kept at a pH of 8.0 to 9.5 by the addition of sulfuric acid. It is advisable to maintain a solution of this type in contact with the freshly formed hydrogel for some time after formation. For example, the solution is recirculated through the freshly formed hydrogel or otherwise maintained in contact therewith for a period of from about 2 to about 24 hours after forming in order to fix the alumina. Such treatment of the freshly formed hydrogel is designated herein as "aging."

After the aging treatment, the chromia-alumina-silica hydrogel is water-washed free of anions introduced during aging. The washed hydrogel can be satisfactorily dried in either superheated steam or heated air. Hydrogels so dried may be tempered at an elevated temperature generally in the range of 500° F. to 1200° F. in an inert or reducing atmosphere, such as flue gas.

The resulting particles of chromia-alumina-silica gel are evacuated to a reduced pressure of generally less than 10 mm. of mercury and preferably less than 2 mm. of mercury. Evacuation of the gel particles serves a twofold purpose. First, it assures substantial removal of air from the pores of the gel which, if permitted to remain, would cause breakage of the gel particles when the same are subsequently contacted with aqueous impregnating solution. Second, evacuation of the gel particles affords a uniform and rapid distribution of the impregnating solution throughout the evacuated particles and thus provides a uniform, active surface of molybdena on the chromia-alumina-silica gel.

The gel particles, in evacuated condition, are brought into contact with an aqueous solution of a water-soluble molybdenum compound. A solution of molybdic acid or ammonium molybdate is preferred for such purpose although the alkaline salts of this acid or other readily available molybdenum-containing compounds which are soluble in water may likewise be used. The concentration of the impregnating solution may be varied, depending upon the composition of the catalyst desired. Sufficient solution is used to cover the chromia-alumina gel particles during impregnation. The particles are permitted to remain in contact with the impregnating solution for a length of time sufficient to permit the solution to impregnate the chromia-alumina-silica gel. Under the usual conditions contemplated for impregnation, this time will generally range from one second up to about ten minutes.

At the completion of the impregnation, the catalyst is removed from the vacuum chamber and the wet impregnated particles are slowly heated to an elevated temperature in the range of 800 to 1000° F. The rate of such heating should be comparatively slow, generally not in excess of 10° F. per minute. During the period of heating the wet catalyst particles, the atmosphere surrounding such particles should be desirably free of oxygen. This may be accomplished by maintaining an inert atmosphere in contact with the particles during the course of heating. In a preferred embodiment of the invention, a non-oxidizing atmosphere may be provided by permitting the steam produced from the moisture contained in the wet catalyst to blanket the mass of particles being heat-treated. The resulting catalyst is a composite consisting essentially of the chromia-alumina-silica gel impregnated with an effective amount of molybdena.

The evacuation, impregnation, and subsequent heat treatment of the chromia-alumina-silica gel particles in accordance with this invention may be carried out either as a batch or continuous operation. Thus, the chromia-alumina-silica gel particles after evacuation may be permitted to contact the molybdic acid or other impregnating solution under substantially static conditions for the requisite time or the gel particles may be passed through a solution of the impregnating solution or, alternatively, the impregnating solution may be circulated through a stationary bed of the gel particles. Likewise, contact between the impregnating solution and the chromia-alumina-silica gel particles may be accomplished by counter-current passage thereof through an elongated treating zone. Heat treatment of the impregnated particles may also be effected as a batch or continuous operation. An alternate method of preparation for the co-gelled chromia-alumina-silica composite impregnated with molybdena as described herein involves contacting the aged, water-washed chromia-alumina-silica hydrogel prepared as hereinabove described with an aqueous solution of a water-soluble molybdenum compound such as molybdic acid or the alkaline salts thereof. In this method of operation, the period of impregnation will generally be within the range of 2 to 48 hours. The impregnated composite is thereafter dried preferably in superheated steam at a temperature of 220–250° F. and subsequently tempered at an elevated temperature of about 1000° F. Also, in some instances, it may be desirable to prepare the catalyst by purging the dried, tempered chromia-alumina-silica gel particles under atmospheric pressure with steam at a temperature above 212° F., thereby replacing the air which normally occupies the gel pores with steam. The gel particles so treated may then be brought into contact with the aqueous impregnating solution of molybdenum compound without encountering gel breakage and impregnation thereafter effected as in the case of the above-described evacuated particles.

The advantage of the present catalyst and procedure of preparation over those of the prior art is that a homogeneous, active catalyst surface is obtained and that the stability of the resultant four-component composite is distinctly improved as compared with commercial chromia-alumina catalysts. Thus, the catalyst described herein, comprising an intimate composite of alumina, chromia, silica, and molybdena in specified amounts possesses both greater selectivity and activity than chromia-alumina, molybdena-alumina, or chromia-alumina-molybdena composites of corresponding composition. It would appear that the advantages described in reforming with the present catalyst are due to the specific promoting effect of the specified quantities of molybdena when the same are combined with chromia-alumina-silica gel of the above-recited composition range.

The catalyst of the present invention is further advantageous in that it possesses a lower density as compared with comparable chromia-alumina or alumina-chromia-molybdena catalysts. For example, a catalyst of chromia-alumina-molybdena had a density of 1.05 grams per cc., which is approximately the same as that of chromia-alumina of comparable composition, while a catalyst prepared by the process described herein containing the same ratio of molybdena and in addition 2.7 per cent by weight of silica had a density of 0.94 grams per cc. It is well known that lower density catalysts have advantages with respect to regeneration and other phases of operation over comparable catalysts of higher density.

Selectivity in a reforming catalyst is highly desirable since it further increases the octane number of reformed gasoline, produces a gasoline of higher volatility and converts higher boiling fractions to lower boiling fractions within the range of gasoline. The improved catalysts of the present invention are particularly desirable for reforming operations using a wide variety of stocks because the catalyst is unaffected by the presence of sulfur and is capable of effecting the desired aromatization and controlled cracking under selected conditions of operation.

While certain details referred to in the foregoing description have been directed to catalyst preparation in which chromia-alumina-silica gel is employed in the form of spheroidal particles, it is to be realized that it is within the purview of this invention to use chromia-alumina-silica gels of any other desired form or shape.

The following non-limiting illustrative example will serve to more specifically point out the process of the invention and the improved results in activity and selectivity obtained with a catalyst prepared in accordance with said process.

*Example*

A chromia-alumina-silica hydrogel was prepared from the following reactants:

Solution A.—Chromic acetate having an acetic acid to chromium mole ratio of 3.0, a chromium content of 6.318 per cent and a density at 77° F. of 1.207 g./cc.

Solution B.—Aqueous sodium aluminate having a sodium to aluminum ratio of 1.30, an aluminum content of 11.68 per cent by weight, and a density of 1.52 g./cc. at 77° F.

Solution C.—Aqueous sodium silicate having an $Na_2O/SiO_2$ ratio of 0.31, an $SiO_2$ content of 4.47 per cent by weight, and a density of 1.04 g./cc. at 77° F.

Solutions B and C were mixed in the following proportions: Solution B, 174.1 pounds; Solution C, 40.32 pounds. The resulting mixture was mixed in a nozzle with Solution A at a rate of 700 cc. per minute to form a hydrosol having a pH of 11.9 and a gel time of 9.4 seconds at 122° F.

The hydrosol so formed was distributed by means of a cone and allowed to flow into a column of immiscible oil where the hydrosol formed spherical bead-like particles of all-embracing hydrogel. The resulting hydrogel was then aged with a 20 per cent by weight aqueous solution of ammonium sulfate for 24 hours at a pH of 9.5. Following this treatment, the hydrogel was washed free of water-soluble salts. The washed hydrogel had a product concentration of 18 per cent by weight. The hydrogel was thereafter dried in superheated steam at 235° F. and then tempered 3 hours at 1000° F. in an inert atmosphere supplied by the moisture evolved from the hydrogel particles. The resulting beads of gel contained approximately 30.4 per cent by weight of chromia, 66.6 per cent by weight of alumina and 3.0 per cent by weight of silica.

One thousand grams of the above-described chromia-alumina-silica gel beads were placed in a suitable chamber and evacuated to a pressure of 2 mm. of mercury. An aqueous solution of 500 grams of ammonium molybdate solution having a concentration of 22.2 per cent by weight of $MoO_3$ was then introduced into the chamber. The gel beads were permitted to remain in contact with the ammonium molybdate solution for a period of 5 to 10 seconds, after which the impregnated gel beads were removed from the vacuum chamber and slowly heated to 1000° F. at a rate of 4° F. per minute. During the heating period, the atmosphere surrounding the impregnated gel particles was maintained free of oxygen by permitting steam from the moisture contained in the catalyst to blanket the mass of gel particles. The resulting catalyst had the following composition:

| | Per cent weight |
|---|---|
| Chromia | 28.0 |
| Alumina | 59.3 |
| Silica | 2.7 |
| Molybdena | 10.0 |

The above-described catalyst together with a chromia-alumina co-gel catalyst containing 32 per cent $Cr_2O_3$ and 68 per cent $Al_2O_3$ by weight and a catalyst consisting essentially of molybdena and alumina containing 10 per cent $MoO_3$ and 90 per cent $Al_2O_3$ by weight were tested in reforming a naphtha petroleum fraction under the following conditions:

| | |
|---|---|
| Temperature ° F | 910 |

(Except with catalyst containing 32 per cent $Cr_2O_3$ and 68 per cent $Al_2O_3$, a temperature of 960° F. was employed)

| | |
|---|---|
| Liquid Hourly Space Velocity | 1 |
| Time on Stream, Hours | 2 |
| Recycle to Naphtha Mole Ratio | 6 |
| Hydrogen to Hydrocarbon Mole Ratio | 4 |
| Total Pressure, p. s. i. g | 175 |

Figure 1:
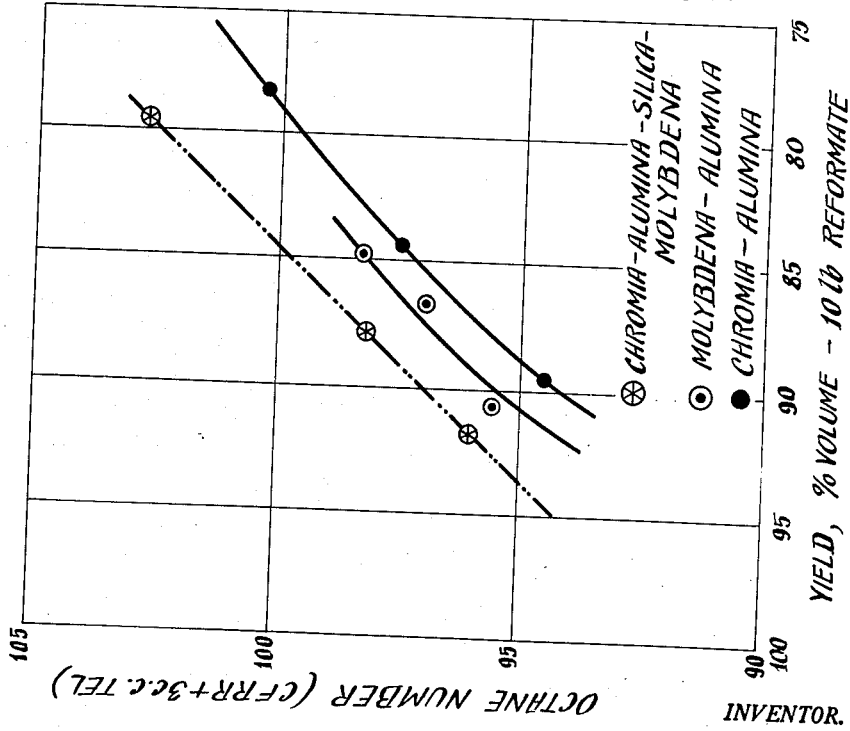

Results obtained in this operation are shown graphically in Figure 1 of the attached drawing. Referring more particularly to Figure 1, showing the yield-octane number relationship, it will be noted that the chromia-alumina-silica-molybdena catalyst showed an increase over the chromia-alumina catalyst of 4.5 per cent volume yield and an increase over the molybdena-alumina catalyst of 2.5 per cent volume yield at the 98 (CFRR+3 cc. TEL) level.

The improvement in activity of the present catalyst as compared with a chromia-alumina-molybdena catalyst is shown in Figure 2 of the attached drawing. This figure shows the average temperature required to produce reformate of various octane ratings using chromia-alumina-molybdena (28.8 per cent $Cr_2O_3$—61.2 per cent $Al_2O_3$—10.0 per cent $MoO_3$) and a catalyst of the present invention containing the same ratio of molybdena but containing silica in addition (28.0 per cent $Cr_2O_3$—59.3 per cent $Al_2O_3$—2.7 per cent $SiO_2$—10.0 per cent $MoO_3$). It will be noted that the fresh catalyst containing silica requires a temperature approximately 6° F. lower at the 98 (CFRR+3 cc. TEL) level than that for the chromia-alumina-molybdena. After aging, which involved using the catalyst in 298 cycles for reforming a petroleum naphtha at an average reactor temperature of 875° F., a liquid hourly space velocity of 1.0, a pressure of 90 p. s. i. g. and a hydrogen to hydrocarbon mole ratio of 5 and employing a maximum regeneration temperature of 1050° F., the catalyst containing silica showed an additional decrease of 3.5° F. These results are indicative of the greater activity and greater stability of the improved catalyst, particularly in view of the fact that chromia-alumina catalyst of the co-gel type requires about 50° F. higher operating temperature than the former.

It is to be understood that the above description is merely illustrative of the preferred embodiments of the invention, of which many variations may be made within the scope of the following claims by those skilled in the art without departing from the spirit thereof.

I claim:

1. A catalytic composite consisting essentially of 25 to 50 per cent by weight of chromia, 30 to 69 per cent by weight alumina, 1 to 5 per cent by weight of silica, and 5 to 15 per cent by weight of molybdena, wherein the chromia, alumina, and silica components in the form of a co-gel are impregnated with the molybdena component.

2. A catalytic composite consisting essentially of 27 to 30 per cent by weight of chromia, 55 to 62 per cent by weight of alumina, 3 to 5 per cent by weight silica, and 8 to 12 per cent by weight molybdena, wherein the chromia, alumina, and silica components in the form of a co-gel are impregnated with the molybdena component.

3. A method for preparing an intimate catalytic composite of chromia, alumina, silica, and molybdena, which comprises preparing a chromia-alumina-silica co-gel consisting of predominating proportions of alumina and chromia and a minor proportion of silica by mixing aqueous solutions of sodium aluminate, chromic acetate and sodium silicate to yield a hydrosol having an inorganic oxide content of at least about 10 per cent by weight, controlling the sodium to aluminum ion ratio and the acetate to chromium ion ratio in said solutions to effect rapid gelation of said hydrosol to a hydrogel, aging the hydrogel so obtained in a mildly alkaline aqueous medium, washing the aged hydrogel, drying and tempering the same to yield a resulting hard chromia-alumina-silica gel, removing substantially all of the air from the pores of said gel, thereafter bringing said gel into contact with an aqueous solution of a water-soluble molybdenum compound and maintaining said contact for a predetermined time sufficient to effect impregnation of said gel with said solution, removing the gel from the impregnating solution and drying the same in an oxygen-free atmosphere to yield a chromia-alumina-silica gel consisting essentially of 25 to 50 per cent by weight of chromia, 30 to 69 per cent by weight of alumina, and 1 to 5 per cent by weight of silica, said gel being impregnated with a small amount of between about 5 and about 15 per cent by weight of molybdena.

4. A method for producing an intimate catalytic composite of chromia, alumina, silica, and molybdena, which comprises preparing a chromia-alumina-silica co-gel by mixing aqueous solutions of sodium aluminate, chromic acetate and sodium silicate to yield to hydrosol having a chromia-alumina-silica content of at least about 10 per cent by weight, controlling the sodium to aluminum ion ratio and the acetate to chromium ion ratio in said solutions to effect rapid gelation of said hydrosol to a hydrogel, aging the hydrogel so obtained in a mildly alkaline aqueous medium, washing the aged hydrogel, bringing the washed hydrogel into contact with an aqueous solution of a water-soluble molybdenum compound and maintaining said contact for a predetermined time sufficient to effect impregnation of said hydrogel with said solution, removing the hydrogel from the impregnating solution and drying the same to yield a chromia-alumina-silica gel consisting essentially of 25 to 50 per cent by weight of chromia, 30 to 69 per cent by weight of alumina, and 1 to 5 per cent by weight of silica, said gel being impregnated with a small amount of between about 5 and about 15 per cent by weight of molybdena.

5. A method for producing an intimate catalytic composite of chromia, alumina, silica, and molybdena, which comprises forming spheroidal particles of chromia-alumina-silica gel, removing substantially all of the air from said gel particles by evacuating the same to a reduced pressure, bringing the evacuated particles into contact with an aqueous ammonium molybdate solution, maintaining said contact for a predetermined time sufficient to effect impregnation of said particles with said solution, removing the particles from the impregnating solution and drying the same in a steam atmosphere to yield spheroidal particles of chromia-alumina-silica gel consisting essentially of 27 to 30 per cent by weight of chromia, 55 to 62 per cent by weight of alumina, and 3 to 5 per cent by weight of silica, said gel being impregnated with 8 to 12 per cent by weight of molybdena.

6. A method for preparing an intimate catalytic composite of chromia, alumina, silica, and molybdena, which comprises preparing a chromia-alumina-silica co-gel consisting of a major proportion of alumina and minor proportions of chromia and silica by mixing aqueous solutions of sodium aluminate, chromic acetate and sodium silicate to yield a hydrosol having a chromia-alumina-silica content of at least about 10 per cent by weight, controlling the sodium to aluminum ion ratio of said sodium aluminate solution, the acetate to chromium ion ratio of said chromic acetate solution and the silica content of said sodium silicate solution to effect rapid gelation of said hydrosol to an all-embracing hydrogel, aging the hydrogel so obtained in a mildly alkaline aqueous medium, washing the aged hydrogel, drying and tempering the same to yield a resulting hard chromia-alumina-silica gel, evacuating said gel to a reduced pressure, bringing the evacuated gel into contact with an aqueous solution of a water-soluble molybdenum compound and maintaining said contact for a predetermined time sufficient to effect impregnation of said gel with said solution, removing the gel from the impregnating solution and drying the same in an oxygen-free atmosphere to yield a chromia-alumina-silica gel consisting essentially of 25 to 50 per cent by weight of chromia, 30 to 69 per cent by weight alumina, and 1 to 5 per cent by weight of silica, said gel being impregnated with from 5 to 15 per cent by weight of molybdena.

7. A method for preparing an intimate catalytic composite of chromia, alumina, silica, and molybdena, which comprises preparing a chromia-alumina-silica co-gel consisting of a major proportion of alumina and minor proportions of chromia and silica by mixing aqueous solutions of sodium aluminate, chromic acetate, and sodium silicate to yield a hydrosol having a chromia-alumina-silica content of at least about 10 per cent by weight, controlling the sodium to aluminum ion ratio, the acetate to chromium ion ratio and the per cent weight of silica in said solutions to effect rapid gelation of said hydrosol to an all-embracing precipitate-free hydrogel, aging the hydrogel so obtained in a mildly alkaline aqueous medium, washing the aged hydrogel, drying and tempering the same to yield a resulting hard chromia-alumina-silica gel, evacuating said gel to a reduced pressure, bringing the evacuated gel into contact with an aqueous solution of a water-soluble molybdenum compound and maintaining said contact for a predetermined time sufficient to effect impregnation of said gel with said solution, removing the gel from the impregnating solution and drying the same in an oxygen-free atmosphere to yield a chromia-alumina-silica gel consisting essentially of 25 to 50 per cent by weight of chromia, 30 to 69 per cent by weight alumina, and 1 to 5 per cent by weight of silica, said gel being impregnated with from 5 to 15 per cent by weight of molybdena.

8. A method for preparing an intimate catalytic composite of chromia, alumina, silica, and molybdena, which comprises preparing a chromia-alumina-silica co-gel consisting of a major proportion of alumina and minor proportions of chromia and silica by mixing an aqueous solution of sodium aluminate with an aqueous solution of sodium silicate, the silica concentration of which is less than about 10 per cent by weight, contacting the resulting mixture with an aqueous solution of chromic acetate to yield a hydrosol having a chromia-alumina-silica content of at least about 10 per cent by weight, controlling the sodium to aluminum ion ratio and the acetate to chromium ion ratio in said solutions to effect rapid gelation of said hydrosol to a hydrogel, aging the hydrogel so obtained in a mildly alkaline aqueous medium, washing the aged hydrogel, drying and tempering the same to yield a resulting hard chromia-alumina-silica gel, evacuating said gel to a reduced pressure, bringing the evacuated gel into contact with an aqueous solution of a water-soluble molybdenum compound and maintaining said contact for a predetermined time sufficient to effect impregnation of said gel with said solution, removing the gel from the impregnating solution and drying the same in an oxygen-free atmosphere to yield a chromia-alumina-silica gel consisting essentially of 25 to 50 per cent by weight of chromia, 30 to 69 per cent by weight alumina, and 1 to 5 per cent by weight of silica, said gel being impregnated with from 5 to 15 per cent by weight of molybdena.

9. A method for preparing an intimate catalytic composite of chromia, alumina, silica, and molybdena, which comprises preparing a chromia-alumina-silica cogel consisting of predominating proportions of alumina and chromia and a minor proportion of silica by mixing aqueous solutions of sodium aluminate, chromic acetate, and sodium silicate to yield a hydrosol having an inorganic oxide content of at least about 10 per cent by weight, controlling the sodium to aluminum ion ratio and the acetate to chromium ion ratio in said solutions to effect rapid gelation of said hydrosol to a hydrogel, aging the hydrogel so obtained in a mildly alkaline aqueous medium, washing the aged hydrogel, drying and tempering the same to yield a resulting hard chromia-alumina-silica gel, purging said gel with steam at a temperature above 212° F. for a period of time sufficient to replace air normally occupying the pores of said gel with steam, thereafter bringing said gel into contact with an aqueous solution of a water-soluble molybdenum compound and maintaining said contact for a predetermined time sufficient to effect impregnation of said gel with said solution, removing the gel from the impregnating solution and drying the same in an oxygen-free atmosphere to yield a chromia-alumina-silica gel consisting essentially of 25 to 50 per cent by weight of chromia, 30 to 69 per cent by weight of alumina, and 1 to 5 per cent by weight of silica, said gel being impregnated with a small amount of between about 5 and about 15 per cent by weight of molybdena.

References Cited in the file of this patent

UNITED STATES PATENTS

| | | |
|---|---|---|
| 2,241,708 | Laying | May 13, 1941 |
| 2,270,165 | Groll et al. | Jan. 13, 1942 |
| 2,283,173 | Bates | May 19, 1942 |
| 2,378,155 | Newsome et al. | June 12, 1945 |
| 2,384,946 | Marisic | Sept. 18, 1945 |
| 2,453,084 | Brown | Nov. 2, 1948 |
| 2,588,402 | Milliken | Mar. 11, 1952 |
| 2,635,082 | Smith | Apr. 14, 1953 |